(12) United States Patent
King et al.

(10) Patent No.: US 9,477,719 B2
(45) Date of Patent: Oct. 25, 2016

(54) SEARCH USING BUSINESS INTELLIGENCE DIMENSIONS

(75) Inventors: Nigel King, San Mateo, CA (US); Joseph Blau, Sharon, MA (US); Anping Wang, Redwood City, CA (US); Tony K. Wong, San Francisco, CA (US); Suhas Rohit Mehta, San Jose, CA (US); Do Joon Ra, Mountain View, CA (US); Ming Lam, San Mateo, CA (US); Linda M. Bao, Santa Clara, CA (US); Tulasi Ram Kodali, Somerset, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 1521 days.

(21) Appl. No.: 12/200,513

(22) Filed: Aug. 28, 2008

(65) Prior Publication Data

US 2010/0057679 A1 Mar. 4, 2010

(51) Int. Cl.
*G06F 17/30* (2006.01)

(52) U.S. Cl.
CPC ... *G06F 17/30554* (2013.01); *G06F 17/30389* (2013.01)

(58) Field of Classification Search
USPC ........................................................ 707/769
See application file for complete search history.

(56) References Cited

U.S. PATENT DOCUMENTS

| | | |
|---|---|---|
| 6,584,468 B1 | 6/2003 | Gabriel et al. |
| 7,305,390 B2 | 12/2007 | Bowman et al. |
| 2002/0143759 A1 | 10/2002 | Yu |
| 2007/0005564 A1 | 1/2007 | Zehner |
| 2008/0005105 A1 | 1/2008 | Lawler et al. |
| 2008/0010268 A1 | 1/2008 | Liao et al. |
| 2008/0033797 A1 | 2/2008 | Chickering et al. |
| 2008/0046414 A1* | 2/2008 | Haub et al. ............... 707/3 |
| 2008/0046838 A1* | 2/2008 | Haub et al. ............... 715/810 |
| 2008/0243785 A1* | 10/2008 | Stading ..................... 707/3 |
| 2008/0243787 A1* | 10/2008 | Stading ..................... 707/3 |
| 2008/0244429 A1* | 10/2008 | Stading ..................... 715/764 |

OTHER PUBLICATIONS

Oracle, "Secure Enteprise Search", http://www.oracle.com/technology/products/oses/pdf/SES_technical_whitepaper_10.1.8.2.pdf, Oct. 2007.

* cited by examiner

*Primary Examiner* — Joshua Bullock
(74) *Attorney, Agent, or Firm* — Miles & Stockbridge P.C.

(57) ABSTRACT

A search system receives business intelligence dimensions and at least one text search term. The system generates and displays key performance indicators based on the business intelligence dimensions, and generates and displays search results based on the text search term. The search results are restricted by facets, and the facets are derived from the business intelligence dimensions.

14 Claims, 5 Drawing Sheets

Fig. 2

SEARCH USING BUSINESS INTELLIGENCE DIMENSIONS

FIELD OF THE INVENTION

One embodiment is directed to computer systems, and more particularly to searching data on computer systems.

BACKGROUND INFORMATION

The existing amount of information available over the Internet is staggering. There are an enormous number of web pages that are full of searchable information on almost any topic of interest. Moreover, this amount of information is increasing at a geometric rate. This sheer volume of information has made the search for specific types of information a significant challenge.

A complete field of technology has arisen that focuses upon making it easier for a user to find information available over the Internet. There are a large number of search engines from companies such as Google and Microsoft that permit the user to enter key words or phrases. The search engine then searches the Internet to find web pages that contain the key terms. The results are then presented to the user in some sort of ranked fashion as a flat list. Sometimes a portion of the results is set apart from the rest of the results based on factors such as advertising expenditures, unique grouping of search words, etc. However, given the sheer volume of information available over the Internet, typical search results are so large that it is difficult for a user to find the really relevant web pages or data.

The widespread adoption of the Internet search paradigm for searching on the public Internet has caused an expectation to be able to search for private data within an organization or enterprise with the same degree of ease. Known solutions for searching for enterprise data are typically referred to as "Enterprise Search", which utilize search or business intelligence mechanisms. Search tends to be focused on the retrieval of a single object. Business intelligence tends to be at high levels of aggregation. Enterprise Search will return results at detailed level across multiple objects. For example, business intelligence might count the number of service requests for a given period and a given product family, whereas Enterprise Search would show details for a number of objects, such as details for all the service requests, e-mail conversations, engineering changes, sales orders, etc.

SUMMARY OF THE INVENTION

One embodiment is a search system that receives business intelligence dimensions and at least one text search term. The system generates and displays key performance indicators based on the business intelligence dimensions, and generates and displays search results based on the text search term. The search results are restricted by facets, and the facets are derived from the business intelligence dimensions.

BRIEF DESCRIPTION OF THE DRAWINGS

FIG. 2 illustrates an example of a search user interface that performs text search of data sources in accordance with one embodiment.

DETAILED DESCRIPTION

One embodiment using business intelligence dimensions in order to categorize text search engine results. Therefore, the search results are presented to a user in a more organized and streamlined manner.

The term "business intelligence" ("BI") refers to technologies, applications and practices for the collection, integration, analysis, and presentation of business information and also sometimes to the information itself. The purpose of BI is to support better business decision making. BI systems provide historical, current, and predictive views of business operations, most often using data that has been gathered into a data warehouse and occasionally working from operational data.

BI software incorporates the ability to mine, analyze, and report data. Some BI software allows users to cross-analyze and perform deep data research rapidly for better analysis of sales or performance on an individual, department, or company level. Business intelligence often uses key performance indicators ("KPI"s) to assess the present state of business and to prescribe a course of action. KPIs are financial and non-financial metrics used to help an organization define and measure progress toward organizational goals. Examples of KPIs are metrics such as lead conversion rate (in sales) and inventory turnover (in inventory management).

Figure 1:
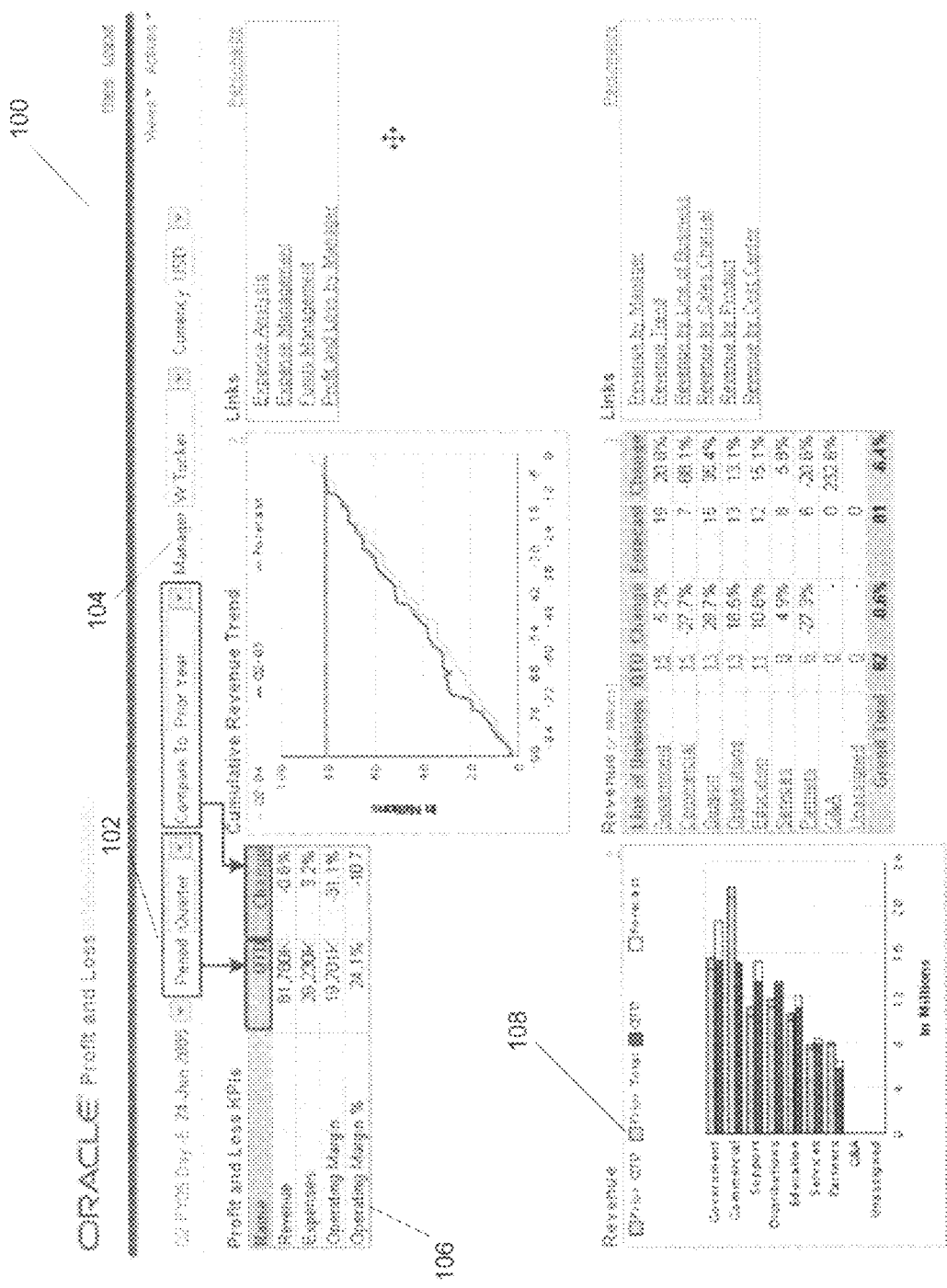
FIG. 1 illustrates an example of a dashboard user interface that displays business intelligence data in accordance with one embodiment.

BI data is typically presented in the form of a dashboard user interface ("UI"). A dashboard may present BI data sorted by "dimensions" which in general are levels of aggregation. FIG. 1 illustrates an example of a dashboard UI 100 that displays BI in accordance with one embodiment. Dashboard 100 is a profit and loss dashboard and includes two primary dimensions: a time period dimension 102 and a manager dimension 104. By changing these dimensions, the data on the dashboard (such and Profits and Loss KPIs data 106, Revenue data 108, etc.) will change. Examples of other dimensions include a category, a line of business, a cost center, and a product. The dimensions in UI 100 generally structure the BI data so it can be more easily interpreted by an end user.

As opposed to BI data, which can be searched and sorted by dimensions, most keyword or text based search tools generate voluminous data in a flat format that is not easily sorted and is largely unstructured. One known method of sorting text based search results is through "facets". In general, facets are orthogonal categories or attributes used to filter a body of data. For example, shoes have heel height, color, and size attributes. Most online shoppers are only interested in shoes having a certain size or color. A vendor may create a color facet with values such as black, brown, and red, and then allow users to filter the list of shoes to show only those having the desired value of color, say black.

Figure 2:
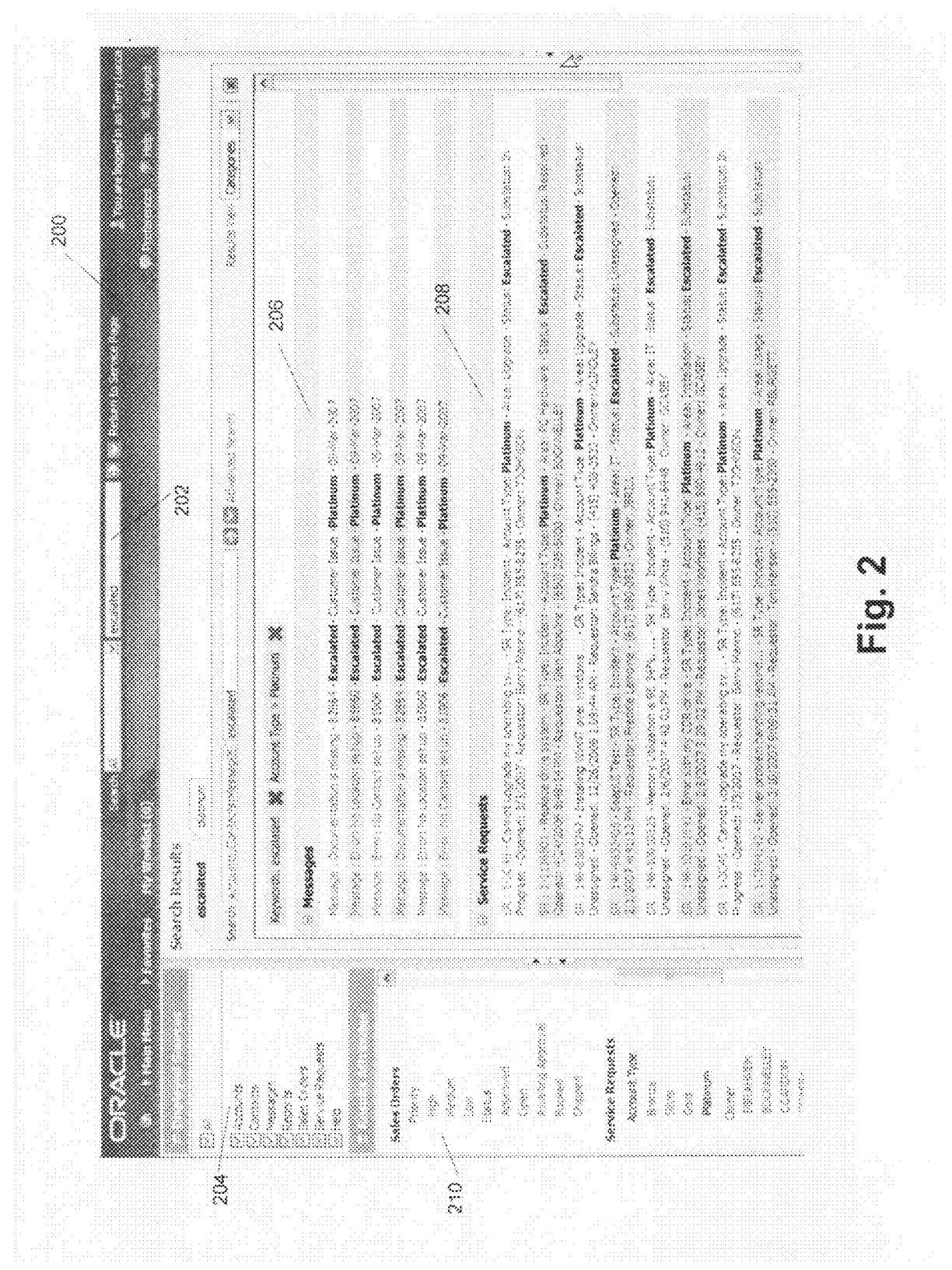

FIG. 2 is a search UI 200 that performs text search of data sources, such as data of a organization's database or an organization's integrated system such as an Enterprise Resource Planning ("ERP") system. In the example of FIG.

2, the term "escalated" (entered in field 202) is searched in the sources selected in field 204. The result is a list of "hits" for each of the sources such as the hits for "Messages" shown under heading 206 and the hits for "Service Requests" shown under heading 208. UI 200 further includes a list of facets or attributes 210 that allow a user to refine the search results, which are generally unstructured. Facets 210 in the text search UI 200 are similar to the dimensions of UI 100 of FIG. 1 and can be considered a common input with BI systems and text search systems.

One embodiment combines the structured information in a dimensional analysis with unstructured information in a keyword search result using common inputs (i.e., dimensions/facets). For example, if a customer service manager is measuring the number of service requests aggregated by month and geographic region, but then wishes to see a list of e-mail traffic and web blog postings for a particular service issue, the whole analysis paradigm shifts from a BI view to a text search based listing view. In one embodiment, the same dimensionality from the BI view is used to summarize the occurrences of searchable objects so that an end user can progress from a high level aggregation to the individual search object.

Figure 3:
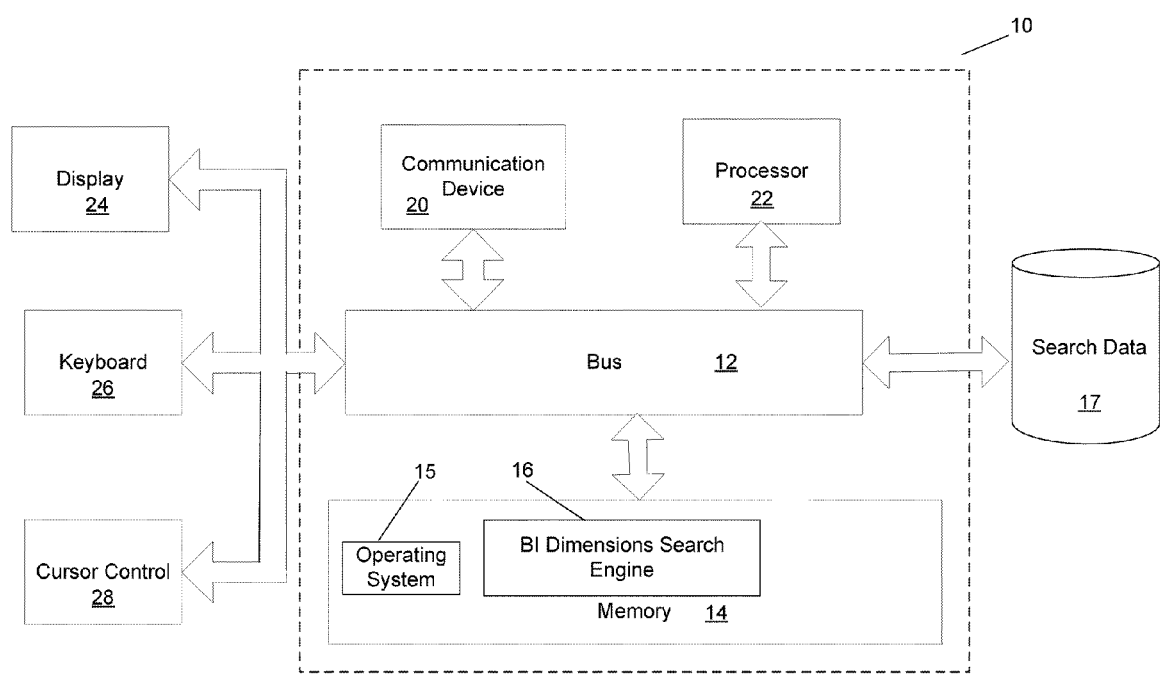
FIG. 3 is a block diagram of a system that can implement an embodiment of the present invention.

FIG. 3 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a BI Dimensions Search Engine 16 that performs searches using BI dimensions as disclosed in more detail below. Bus 12 is further coupled to a database 17 that stores data to be searched. Database 17 may by the source of any type of data, including an organization's ERP data or other integrated system data, or data from the Internet or another network.

Figure 4:
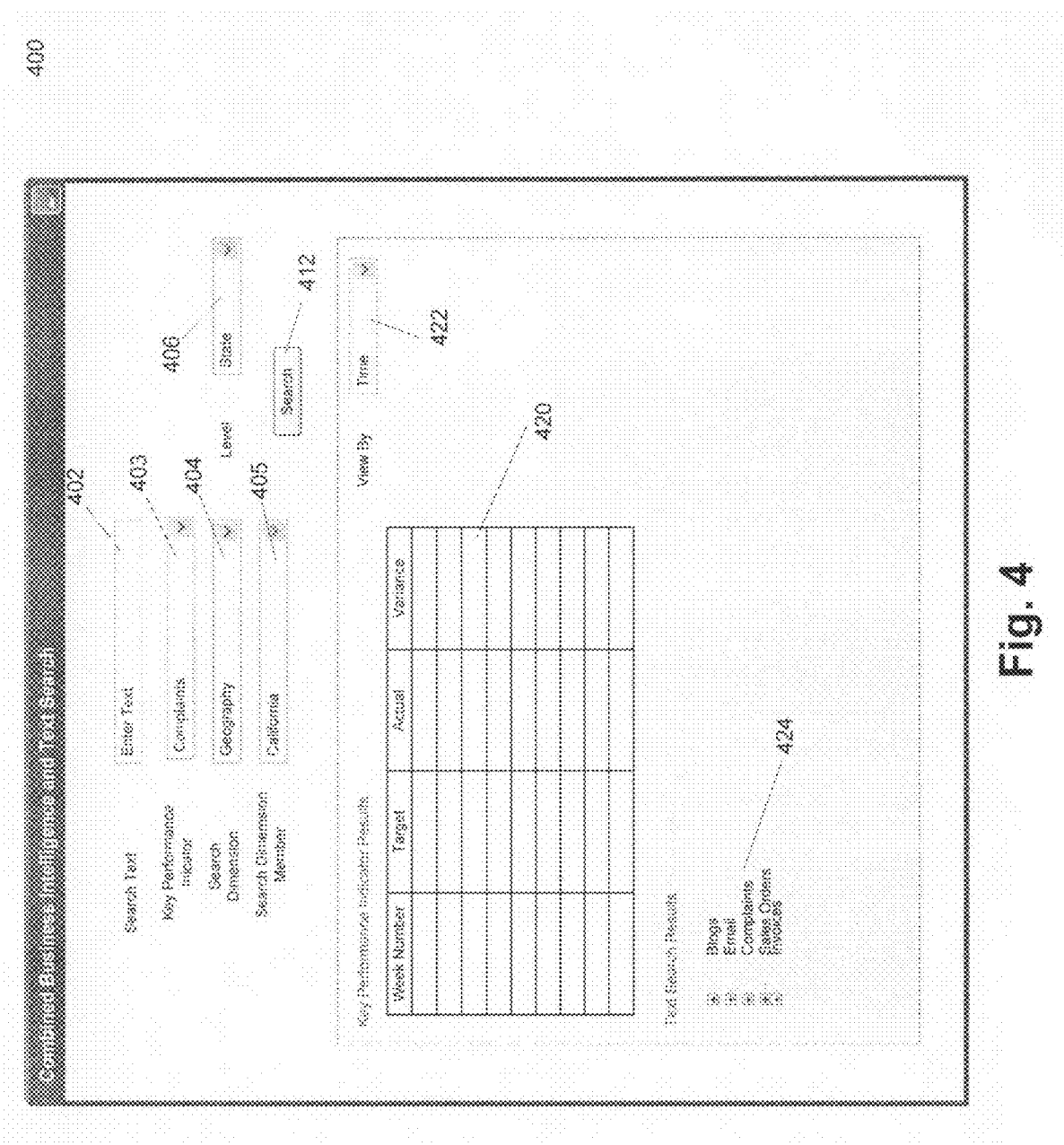
FIG. 4 illustrates a user interface in accordance with one embodiment that receives search and dimension input and provides business intelligence and text search results output.

In one embodiment, BI dimensions are received by system 10 and in response, BI KPIs are displayed as well as faceted search results in which the facets restrict the search results. The dimensions for the BI search also function as the facets. FIG. 4 illustrates a UI 400 in accordance with one embodiment that receives search and dimension input and provides BI and text search results output. In UI 400, a user inputs text for a text search at 402, a KPI for a BI dashboard at 403, a search dimension at 404, and search dimension member at 405 and a dimension level at 406 (search dimension 404, search dimension member 405 and dimension level 406 are collectively referred to as "BI dimensions"). A user can then select search button 412.

After receiving the inputs, system 10 generates multiple outputs. KPI results are displayed at 420. The KPI results are similar to the BI results displayed on dashboard 100 of FIG. 1 and is based on the received BI dimensions. At 422, the viewing parameter may be changed. In addition, text search results are displayed at 424 under multiple headings. The text search results are faceted in that the BI dimensions entered at 404-406 determine the facet sets. The facets of the text search entered at 402 are also the dimensions of the KPIs at 420. Further, the search results at 424 are restricted by facets and the facets are derived from BI Dimensions 404-406 and their values.

Figure 5:
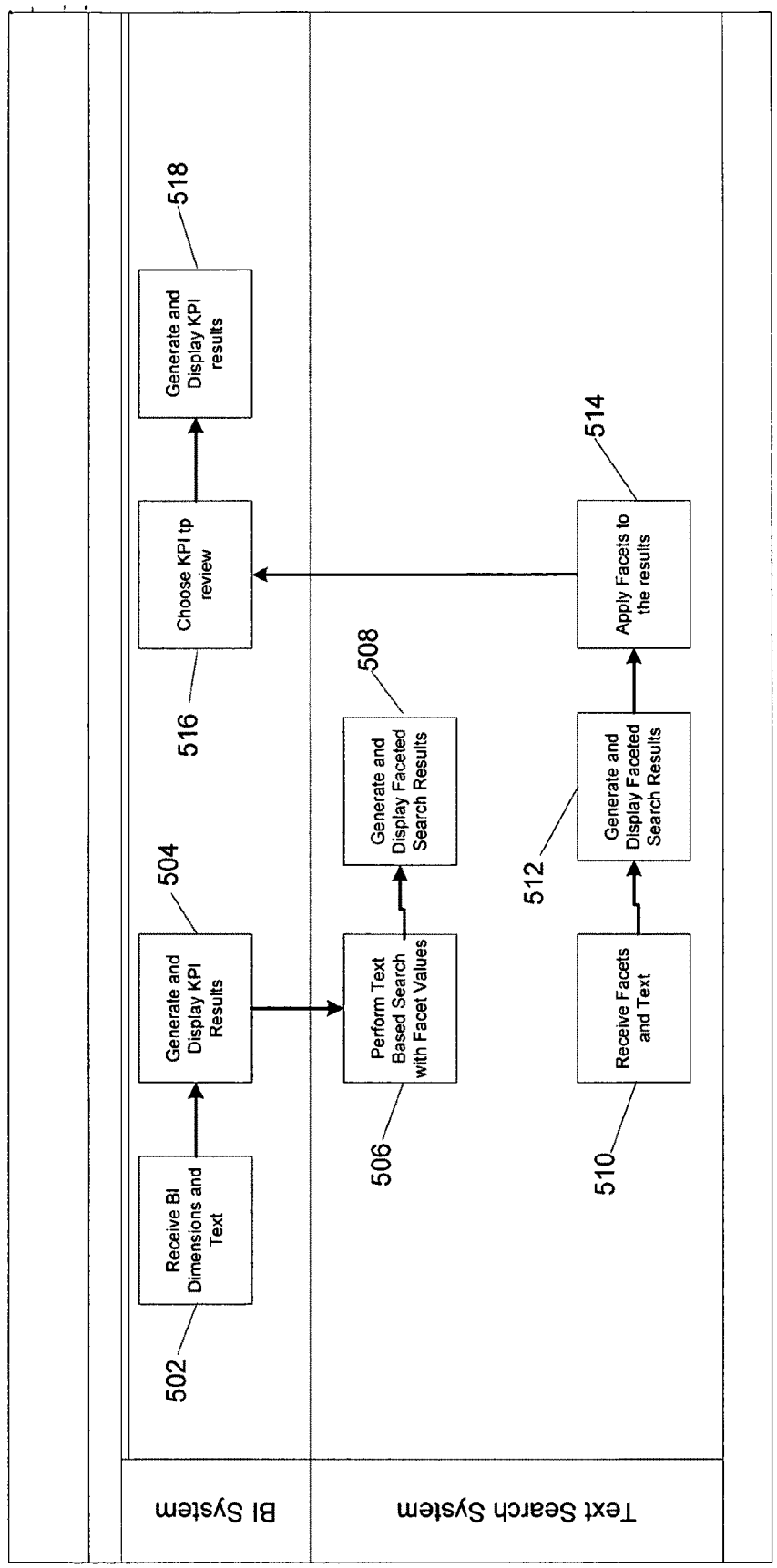
FIG. 5 is a flow diagram of the functionality of the system of FIG. 3 when combining a business intelligence and text search using inputted dimensions in accordance with one embodiment.

FIG. 5 is a flow diagram of the functionality of system 10 when combining a BI and text search using inputted dimensions in accordance with one embodiment. In one embodiment, the functionality of the flow diagram of FIG. 5 is implemented by software stored in memory or other computer readable or tangible medium, and executed by a processor. In other embodiments, the functionality can be performed by hardware, or any combination of hardware and software.

In one embodiment, the search may begin as a BI system based search at 502 or as a text based search at 510. When started as a BI system based search, at 502 the user enters the BI dimensions and text to be searched. For example, if the search is for complaints KPI (to analyze, for example, complaints related to a product), the dimension entered at 502 may be "geography", the dimension level may be "state" and the dimension member may be "California". In one embodiment, the BI dimensions are entered at 404-406 of FIG. 4.

At 504, the KPI results are generated and displayed as a BI dashboard display, such as results 420 of FIG. 4.

At 506, the text search system performs a text search based on the search text entered at 402. In addition, the BI dimensions entered at 502 is used to set the facet values for the text search. In one example, the data sources subject to the search may include complaints, service requests, sales orders, blogs, email, etc.

At 508, the faceted search results are generated and displayed, such as at 424 of FIG. 4.

When started as a text based search at 510, the user enters search text. For example, if searching for complaints about meat products, the user may enter "Suspect meat products" in field 402. Further, facets are entered as BI dimensions in 404-406.

At 512, the faceted search results are generated and displayed, such as at 424 of FIG. 4.

At 514, the facets of the results are applied. The facets in one embodiment are the same as the value of the BI dimensions entered at 404-406 of FIG. 4.

The facets are then passed as BI dimensions to 516 of the BI system and are used to choose a KPI to review in the BI system.

Finally, at 518 the KPI results are displayed by dimension as, for example, table 420.

In one embodiment, whether starting at the BI system or the text search system, the end result is the same output such as what is displayed in UI 400 of FIG. 4. Therefore, by entering facets or dimensions, a user can obtain and display search results from a BI system and a text system. The search results are restricted by facets and the facets are derived from the BI dimensions and their values.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of displaying data, the method comprising:
receiving business intelligence (BI) dimensions, wherein the BI dimensions comprise levels of aggregation used to structure BI data;
receiving at least one text search term;
generating and displaying key performance indicators (KPIs) based on the BI dimensions in a single user interface, wherein the KPIs comprise metrics;
generating text-based search results based on the text search term;
determining facets based on the BI dimensions, wherein the facets comprise attributes used to filter the text-based search results;
restricting the text-based search results using the facets that are based on the BI dimensions; and
displaying the restricted text-based search results in the single user interface;
wherein the display of the KPIs based on the BI dimensions, and the display of the restricted text-based search results based on the text-search term and the facets, are combined using the BI dimensions and the facets; and
wherein the KPIs and the restricted text-based search results are displayed together within the single user interface and the restricted text-based search results are displayed under multiple headings based on the facets.

2. The method of claim 1, wherein the BI dimensions comprise a dimension, a dimension member and a dimension level.

3. The method of claim 1, wherein the facets allow for sorting of the search results.

4. The method of claim 1, wherein the search results comprise enterprise data.

5. The method of claim 4, wherein the enterprise data is stored on a database of an Enterprise Resource Planning system.

6. An enterprise search system comprising:
a processor;
a memory coupled to the processor;
a database coupled to the processor that stores enterprise data;
wherein the memory comprises a search engine that receive business intelligence (BI) dimensions and at least one text search term, wherein the BI dimensions comprise levels of aggregation used to structure BI data;
wherein the search engine generates and displays key performance indicators (KPIs) based on the BI dimensions in a single user interface, wherein the KPIs comprise metrics;
wherein the search engine generates text-based search results based on the text search term;
wherein the search engine determines facets based on the BI dimensions, wherein the facets comprise attributes used to filter the text-based search results;
wherein the search engine restricts the text-based search results using the facets that are based on the BI dimensions;
wherein the search engine displays the restricted text-based search results in the single user interface; and
wherein the search engine combines the display of the KPIs based on the BI dimensions, and the display of the restricted text-based search results based on the text search term and the facets, using the BI dimensions and the facets; and
wherein the KPIs and the restricted text-based search results are displayed together within the single user interface and the restricted text-based search results are displayed under multiple headings based on the facets.

7. The enterprise search system of claim 6, wherein the BI dimensions comprise a dimension, a dimension member and a dimension level.

8. The enterprise search system of claim 6, wherein the facets allow for sorting of the search results.

9. A non-transitory computer readable medium having instructions stored thereon that, when executed by a processor, causes the processor to search data, the instructions comprising:
logic for receiving business intelligence (BI) dimensions, wherein the BI dimensions comprise levels of aggregation used to structure BI data;
logic for receiving at least one text search term;
logic for generating and displaying key performance indicators (KPIs) based on the BI dimensions in a single user interface, wherein the KPIs comprise metrics;
logic for generating text-based search results based on the text search term;
logic for determining facets based on the BI dimensions, wherein the facets comprise attributes used to filter the text-based search results;
logic for restricting the text-based search results using the facets that are based on the BI dimensions; and
logic for displaying the restricted text-based search results in the single user interface;
wherein the display of the KPIs based on the BI dimensions, and the display of the restricted text-based search results based on the text-search term and the facets, are combined using the BI dimensions and the facets; and
wherein the KPIs and the restricted text-based search results are displayed together within the single user interface and the restricted text-based search results are displayed under multiple headings based on the facets.

10. The non-transitory computer readable medium of claim 9, wherein the BI dimensions comprise a dimension, a dimension member and a dimension level.

11. The non-transitory computable readable medium of claim 9, wherein the facets allow for sorting of the search results.

12. A system for searching data comprising:
means for receiving business intelligence (BI) dimensions, wherein the BI dimensions comprise levels of aggregation used to structure BI data;
means for receiving at least one text search term;
means for generating and displaying key performance indicators (KPIs) based on the BI dimensions in a single user interface, wherein the KPIs comprise metrics;
means for generating text-based search results based on the text search term;
means for determining facets based on the BI dimensions, wherein the facets comprise attributes used to filter the text-based search results;
means for restricting the text-based search results using the facets that are based on the BI dimensions; and means for displaying the restricted text-based search results in the single user interface;

wherein the display of the KPIs based on the BI dimensions, and the display of the restricted text-based search results based on the text-search term and the facets, are combined using the BI dimensions and the facets; and wherein the KPIs and the restricted text-based search results are displayed together within the single user interface and the restricted text-based search results are displayed under multiple headings based on the facets.

13. The system of claim 12, wherein the BI dimensions comprise a dimension, a dimension member and a dimension level.

14. The system of claim 12, wherein the facets allow for sorting of the search results.

* * * * *

UNITED STATES PATENT AND TRADEMARK OFFICE
CERTIFICATE OF CORRECTION

PATENT NO. : 9,477,719 B2  
APPLICATION NO. : 12/200513  
DATED : October 25, 2016  
INVENTOR(S) : King et al.

Page 1 of 1

It is certified that error appears in the above-identified patent and that said Letters Patent is hereby corrected as shown below:

On the Title Page

Column 1, under Other Publications, Line 1, Delete "Enteprise" and insert -- Enterprise --, therefor.

In the Specification

In Column 3, Line 58, delete "by" and insert -- be --, therefor.

In the Claims

In Column 6, Line 49, in Claim 11, delete "computable" and insert -- computer --, therefor.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*